United States Patent [19]

Coste

[11] Patent Number: 4,627,924
[45] Date of Patent: Dec. 9, 1986

[54] PROCESS AND APPARATUS FOR THE RECOVERY OF ENERGY FROM AN OZONE PRODUCTION UNIT

[75] Inventor: Christian Coste, Versailles, France

[73] Assignee: Degremont, Rueil-Malmaison, France

[21] Appl. No.: 700,342

[22] Filed: Feb. 13, 1985

Related U.S. Application Data

[63] Continuation of Ser. No. 490,412, May 2, 1983, abandoned.

[30] Foreign Application Priority Data

Mar. 29, 1983 [FR] France .................. 83 05117

[51] Int. Cl.[4] .............................................. C02F 1/78
[52] U.S. Cl. ....................... 210/760; 210/192; 422/186.11; 422/186.12; 422/186.2
[58] Field of Search ............ 422/186.11, 186.12, 422/186.19, 186.2; 210/192, 760; 62/238.6; 237/2 B; 204/176

[56] References Cited

U.S. PATENT DOCUMENTS

| | | | |
|---|---|---|---|
| 2,404,778 | 7/1946 | Allison | 422/186.11 |
| 4,025,441 | 5/1977 | Tobota et al. | 422/186.19 |
| 4,042,012 | 8/1977 | Perry et al. | 62/238.6 |
| 4,256,574 | 3/1981 | Bhargave | 210/760 |
| 4,429,547 | 2/1984 | Granoyd | 62/238.6 |

Primary Examiner—David L. Lacey
Attorney, Agent, or Firm—Wenderoth, Lind & Ponack

[57] ABSTRACT

A process and apparatus for the recovery of energy from an ozone production unit including an ozone generator supplied with gas from pretreatment units and using ozone produced thereby to treat water. Heat released from the pretreatment units and the ozone generator is collected by a first fluid circulating in a first closed fluid circuit. The first fluid is passed in heat exchange relationship with a second closed fluid circuit having a second fluid. The second fluid is also passed in heat exchange relationship with a third closed fluid circulating circuit having a third fluid. The ozone produced by the ozone generator is used to treat water in a water treatment facility. Any residual ozone being transferred to an ozone destroying reactor which employs the third fluid as a heat exchange medium for destroying the residual ozone.

10 Claims, 1 Drawing Figure

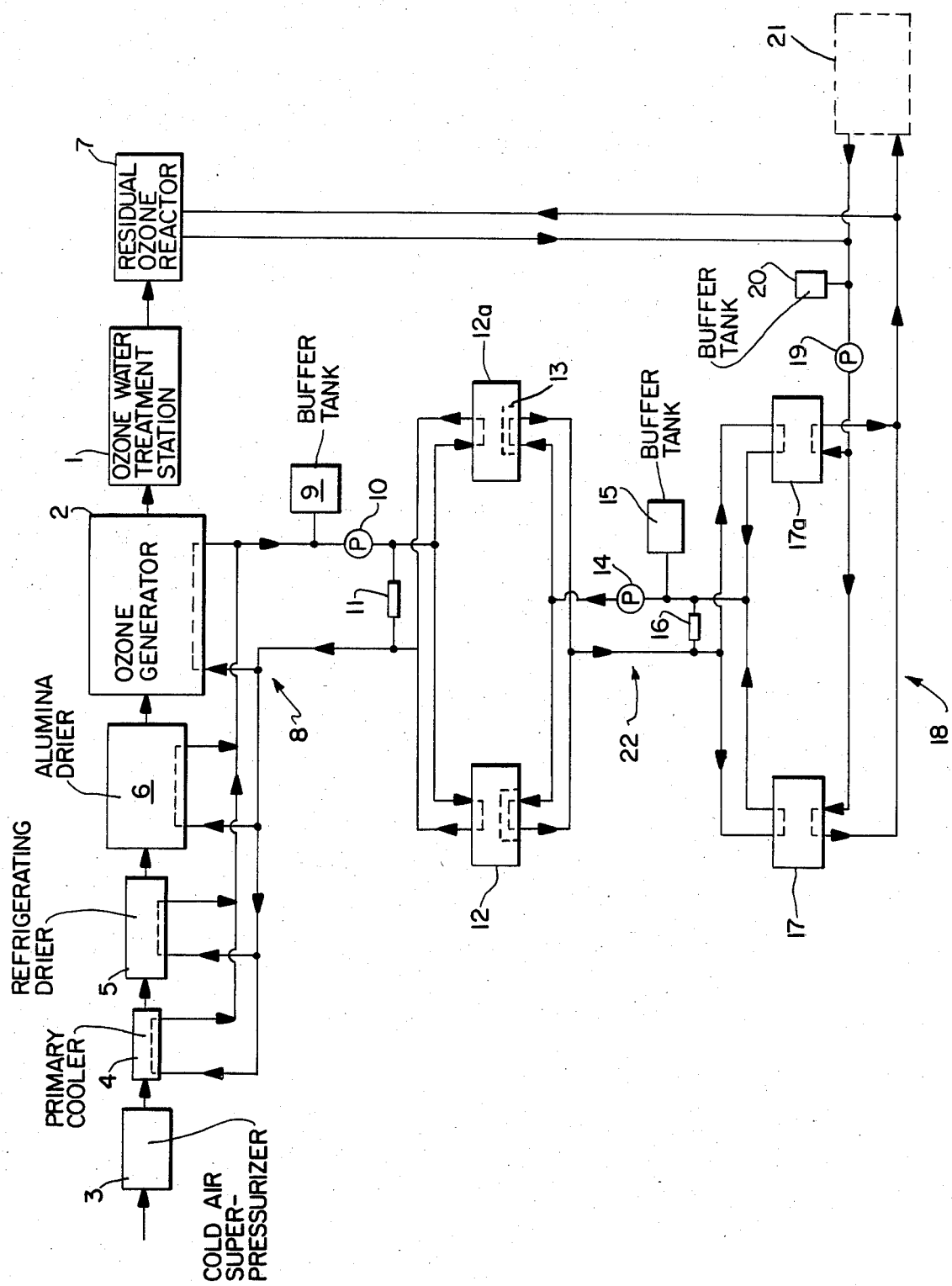

PROCESS AND APPARATUS FOR THE RECOVERY OF ENERGY FROM AN OZONE PRODUCTION UNIT

This application is a continuation of application Ser. No. 490,412, filed May 2, 1983, now abandoned.

BACKGROUND OF THE INVENTION

The present invention relates to a process and apparatus for the recovery of energy from an ozone production unit.

More particularly, the present invention relates to such a process and apparatus whereby the recovered energy may be employed for purposes of heating, air-conditioning, preparing sanitary or industrial hot water, or particularly in accordance with an advantageous arrangement for destroying catalytically or thermally residual ozone remaining after the ozone has been used as an oxidation agent in a water treatment facility whereby water is treated by ozone produced in the ozone production unit. For example, in water treatment facilities in which ozone is used as a disinfectant, the water-ozone contact reactors are not entirely 100% efficient. Thus, it is necessary, as is known, to destroy the residual ozone either catalytically or thermally.

In conventional ozone production units that produce ozone by applying an alternating current of 10–20 kV to a high voltage electrode, thus forming a discharge between such electrode and a second, grounded metal electrode, it is known that only a small fraction, for example 5–10%, of the discharge energy is used to form ozone from the supply of gas, which generally is pressurized air or oxygen. The remainder of the electrical energy applied is converted into lost heat. The ozone yield is reduced if this heat is not effectively eliminated. Commonly, this energy is transferred to a cooling liquid, for example refrigerated water or a mixture of water and glycol.

Pretreating of the air supplied to the ozone generator by means of superpressurizing, conditioning and drying to a dew-point of $-70°$ C. also entails a large release of heat. This released heat generally is lost, with the cooling water simply being transferred toward a drain or a recycling circuit.

SUMMARY OF THE INVENTION

With the above discussion in mind, it is an object of the present invention to provide a process and apparatus for the recovery of energy from an ozone production unit.

It is a further object of the present invention to provide such a process and apparatus whereby such energy is recovered at various stages of an ozone production unit and is employed at a position of utilization.

It is a still further object of the present invention to employ such recovered energy for destroying residual ozone after the ozone produced in the ozone production unit is employed for treating water in a water treatment facility.

These objects are achieved in accordance with one aspect of the present invention by the provision of a process for the recovery of energy from an ozone production unit of the type including an ozone generator supplied with gas from pretreatment units. Heat released from the pretreatment units and ozone generator is collected by means of a first fluid circulating in a first closed fluid circuit including at least one refrigerating unit for cooling the first fluid, while maintaining constant the temperatures of the pretreatment units and the ozone generator by the refrigerating unit. The thus collected heat is transferred from a condenser of the refrigerating unit to at least one heat pump for use in another circuit.

In accordance with a further aspect of the present invention, in a system for the production of ozone and of the type including an ozone generator supplied with gas from pretreatment units, there is provided the improvement of means for recovering energy from such system. Such recovering means includes a first closed fluid circuit, containing a first fluid, for collecting in the first fluid heat released from the pretreatment units and the ozone generator. A refrigerating unit associated with the first circuit cools the first fluid and maintains constant the temperatures in the pretreatment units and the ozone generator. Means, including a condenser of the refrigerating unit, transfers the thus collected heat to at least one heat pump for use in another circuit.

Preferably the first fluid is water or a water-glycol mixture.

The first fluid, cooled by the refrigerating unit is passed through the first circuit in heat exchange relationship with gas in the pretreatment units and the ozone generator, thereby transferring heat from the gas to the first fluid. A second closed fluid circuit contains a second fluid and includes the condenser and heat pump. The second fluid is passed through the condenser in the second circuit in heat exchange relationship with the heated first fluid, thereby transferring the heat to the second fluid. The thus heated second fluid is passed through the second circuit to the heat pump.

In accordance with a further feature of the present invention, a third fluid circuit includes a third fluid which is passed through the third circuit in heat exchange relationship with the heated second fluid at the heat pump, thereby transferring the heat to the third fluid. The thus heated third fluid is passed to a position of utilization.

In accordance with a particularly preferred arrangement of the present invention, there is provided an ozone water treatment facility for thereat treating water by means of ozone produced by the ozone generator. Furthermore, a residual ozone reactor, for example a catalytic reactor or a thermal reactor, is provided for receiving and destroying residual ozone after treatment thereby in the water treatment facility. The third fluid circuit passes the heated third fluid to the reactor, and the heat from the third fluid is utilized for operation of the reactor to destroy the residual ozone.

In accordance with the present invention, there may be provided plural, parallelly connected refrigerating units and/or plural, parallelly connected heat pumps.

In accordance with the present invention, the recovery of the energy from the ozone production unit makes it possible to save a large percentage of the amount of energy required for heating up the ozone-destroying reactor. Thus, in the case of a thermal reactor, up to 50% of the total amount of energy required for operation of such reactor may be saved in accordance with the present invention.

BRIEF DESCRIPTION OF THE DRAWING

Other objects, features and advantages of the present invention will be apparent from the following detailed description, taken with the accompanying drawing, wherein:

The single FIGURE is a schematic view of a system incorporating the apparatus of the present invention and illustrating the operation of the process of the present invention.

DETAILED DESCRIPTION OF THE INVENTION

With reference to the drawing, an ozone production unit of known type includes an ozone generator 2 which is supplied with gas, for example air, from pretreatment units of known type. In the illustrated arrangement, such pretreatment units include a cold air superpressurizer 3, a primary cooler 4 and driers, for example a refrigerating drier 5 and an alumina drier 6. It is to be understood however that the concept of the present invention is intended to be employable with respect to any type of known ozone production unit which releases heat.

A first closed fluid circuit 8 includes a first fluid, for example chilled water cooled by refrigerating units 12, 12a. The first circuit 8 may include a buffer tank 9, a pump 10 and a temperature and flow regulator 11. The first circuit is operated such that the first fluid is circulated in the directions indicated by the arrows in the drawing in heat exchange relationship with gas in the pretreatment units 4, 5, 6 and the ozone generator 2. Thereby, heat from such gas is transferred to the first fluid. A second closed fluid circuit 22 contains a second fluid and includes condensers 13 of the refrigerating units 12, 12a and heat pumps 17, 17a. The second fluid in the second circuit 22 is passed through the condensers 13 in heat exchange relationship with the heated first fluid. Thereby, the recovered heat in the first fluid is transferred to the second fluid. This cools the first fluid which again is recirculated to the pretreatment units 4, 5, 6 and to the ozone generator 2. The thus heated second fluid is passed through the second circuit 22 to heat pumps 17, 17a. Second circuit 22 may include a buffer tank 15, a pump 14 and a temperature and flow regulator 16.

A third fluid circuit 18 includes a third fluid and may have a buffer tank 20 and pump 19. The third fluid is passed through the third circuit 18 in heat exchange relationship with the heated second fluid at heat pumps 17, 17a, thereby transferring such heat to the third fluid. The third fluid then may be passed to a position of utilization, illustrated schematically at 21 in the drawing.

In accordance with a specifically preferred embodiment of the present invention, there is provided an ozone water treatment facility 1 for treating water by means of ozone produced by ozone generator 2. Furthermore, there is provided a residual ozone reactor 7, for example a catalytic reactor or a thermal reactor, for destroying residual ozone remaining after treatment thereby at facility 1. In accordance with this particularly advantageous embodiment of the present invention, the heated third fluid in third circuit 18 is conveyed to the reactor 7 as a position of utilization. The heat from such third fluid is utilized for operation of reactor 7 to destroy the residual ozone.

The following table illustrated energy savings achieved by employing the present invention.

|  | Process of the invention | Conventional process |
|---|---|---|
| Total kWh injected per kg of O₃ produced | 26 | 29 to 30 |
| Available kWh theoretically recoverable | 17 to 18 | 14 to 15 |
| kWh in primary circuit (8) | 16 to 17⊕ | 13.5 to 14⊕⊕ |
| kWh recovered at condensers (13) | 15 to 16 | 0 |
| kWh available in hot fluid circuit (18) for use | 8 to 10 | 0 |
| kWh injected to destroy ozone | 0 | 1.5 to 6 |

⊕recovered
⊕⊕not recovered

Although the present invention has been described and illustrated with regard to preferred features thereof, it is to be understood that various changes may be made to the specifically described and illustrated arrangements without departing from the scope of the present invention.

I claim:

1. A process for the recovery of energy from an ozone production unit including an ozone generator supplied with gas from pretreatment units, and using ozone produced thereby to treat water said process comprising:
   providing a first closed fluid circuit having therein a first fluid;
   circulating said first fluid through said first closed fluid circuit and in heat exchange relationship with gas in said pretreatment units and said ozone generator, thereby transferring heat from said gas to said first fluid;
   providing said first closed fluid circuit with at least one refrigerating unit having a condenser, and by said at least one refrigerating unit cooling the thus heated said first fluid and maintaining constant the temperatures in said pretreatment units and said ozone generator;
   providing a second closed fluid circuit having therein a second fluid and including said condenser and at least one heat pump;
   circulating said second fluid through said condenser in said second closed fluid circuit in heat exchange relationship with said heat first fluid and thereby transferring said heat to said second fluid;
   providing a third closed fluid circuit having therein a third fluid;
   circulating said third fluid through said third closed fluid circuit in heat exchange relationship with the thus heated said second fluid in said at least one heat pump and thereby transferring heat to said third fluid;
   providing an ozone water treatment facility and treating water therein by means of ozone produced by said ozone generator;
   providing a residual ozone reactor and transferring thereto residual ozone remaining after treatment thereby at said facility; and
   passing said heated third fluid to said residual ozone reactor and utilizing the heat from said third fluid for destroying said residual ozone in said reactor.

2. A process as claimed in claim 1, wherein said reactor comprises a catalytic reactor.

3. A process as claimed in claim 1, wherein said reactor comprises a thermal reactor.

4. A process as claimed in claim 1, wherein said at least one refrigerating unit comprises plural refrigerating units connected in parallel.

5. A process as claimed in claim 1, wherein said at least one heat pump comprises plural heat pumps connected in parallel.

6. In a system for the production of ozone and treatment of water including gas pretreatment units and an ozone generator supplied with gas from said pretreatment units, the improvement of means for recovering energy from said system, said recovering means comprising:

a first closed fluid circuit having therein a first fluid;

means for circulating said first fluid through said first closed fluid circuit and in heat exchange relationship with gas in said pretreatment units and said ozone generator and thereby transferring heat from said gas to said first fluid;

refrigerating means, positioned and arranged with respect to said first closed fluid circuit and including a condenser, for cooling the thus heated said first fluid and for maintaining constant the temperatures in said pretreatment units and said ozone generator;

a second closed fluid circuit having therein a second fluid and including said condenser and at least one heat pump;

means for circulating said second fluid through said condenser in said second closed fluid circuit in heat exchange relationship with said heated first fluid and thereby transferring said heat to said second fluid;

a third closed fluid circuit having therein a third fluid;

ozone water treatment means in flow communication with said ozone generator for treating water by means of ozone produced in said ozone generator;

reactor means for receiving and destroying residual ozone after treatment thereby in said treatment means; and means for circulating said third fluid through said third closed fluid circuit in heat exchange relation with the thus heated said second fluid in said at least one heat pump, thereby transferring heat to said third fluid, and then for conveying said heated third fluid to said reactor means.

7. The system claimed in claim 6, wherein said reactor means comprises a catalytic reactor.

8. The system claimed in claim 6, wherein said reactor means comprises a thermal reactor.

9. The system claimed in claim 6, wherein said refrigerating means comprises plural refrigerating units connected in parallel relationship.

10. The system claimed in claim 6, wherein said at least one heat pump comprises plural heat pumps connected in parallel.

* * * * *